United States Patent
Liu

(10) Patent No.: US 11,871,119 B2
(45) Date of Patent: Jan. 9, 2024

(54) METHOD FOR CALCULATING EXPOSURE EVALUATION VALUE AND IMAGING DEVICE

(71) Applicant: BEIJING TUSEN ZHITU TECHNOLOGY CO., LTD., Beijing (CN)

(72) Inventor: Miao Liu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 338 days.

(21) Appl. No.: 17/234,470

(22) Filed: Apr. 19, 2021

(65) Prior Publication Data
US 2021/0314476 A1    Oct. 7, 2021

Related U.S. Application Data

(63) Continuation of application No. PCT/CN2019/077050, filed on Mar. 5, 2019.

(30) Foreign Application Priority Data

Oct. 17, 2018    (CN) .......................... 201811209245.X

(51) Int. Cl.
H04N 23/71    (2023.01)
H04N 23/73    (2023.01)
(Continued)

(52) U.S. Cl.
CPC .............. H04N 23/73 (2023.01); G06T 7/11 (2017.01); H04N 23/71 (2023.01);
(Continued)

(58) Field of Classification Search
CPC ........ H04N 23/71; H04N 25/40; H04N 25/46; H04N 25/78
(Continued)

(56) References Cited

U.S. PATENT DOCUMENTS 6,721,464 B2 * 4/2004 Pain .......................... G06T 5/20
                                                   348/E3.018
2005/0099504 A1 * 5/2005 Nayar ..................... H04N 3/155
                                                   348/E3.018
(Continued)

FOREIGN PATENT DOCUMENTS

CN    1377178 A    10/2002
CN    1964431 A    5/2007
(Continued)

OTHER PUBLICATIONS

International Application No. PCT/CN2019/077050, International Search Report and Written Opinion, dated May 23, 2019, (pp. 1-24).
(Continued)

*Primary Examiner* — Anthony J Daniels
(74) *Attorney, Agent, or Firm* — Perkins Coie LLP

(57) ABSTRACT

The present disclosure provides a method for calculating an exposure evaluation value and an imaging device. The method includes: dividing an image into a plurality of blocks, the plurality of blocks being arranged in a plurality of rows and columns, for each row of the plurality of rows: for each block of the row: accumulating brightness values of the plurality of pixels in the block to obtain an accumulated brightness value; calculating an average brightness value of the block according to the accumulated brightness value; and writing the average brightness value into a first random access memory, and clearing the plurality of registers in response to writing the average brightness value of each block of the row into the first random access memory, and obtaining an exposure evaluation value according to the average brightness values of the plurality of blocks and predetermined weight coefficients of the plurality of blocks.

20 Claims, 3 Drawing Sheets

(51) Int. Cl.
*G06T 7/11* (2017.01)
*H04N 25/46* (2023.01)
*H04N 25/78* (2023.01)
*H04N 25/40* (2023.01)

(52) U.S. Cl.
CPC .... *G06T 2207/20021* (2013.01); *H04N 25/40* (2023.01); *H04N 25/46* (2023.01); *H04N 25/78* (2023.01)

(58) Field of Classification Search
USPC ........................................................ 348/294
See application file for complete search history.

(56) References Cited

U.S. PATENT DOCUMENTS

| | | | |
|---|---|---|---|
| 2006/0109373 A1 | 5/2006 | Kurane | |
| 2008/0024616 A1* | 1/2008 | Takahashi | H04N 23/611 348/221.1 |

FOREIGN PATENT DOCUMENTS

| | | | |
|---|---|---|---|
| CN | 1997113 | A | 7/2007 |
| CN | 101049012 | A | 10/2007 |
| CN | 101064783 | A | 10/2007 |
| CN | 100435562 | C | 11/2008 |
| CN | 101399919 | A | 4/2009 |
| CN | 103281494 | A | 9/2013 |
| CN | 108628267 | A | 10/2018 |
| JP | 2000013612 | A | 1/2000 |
| JP | 2001061105 | A | 3/2001 |

OTHER PUBLICATIONS

Chinese Application No. 201811209245.X, First Search dated May 8, 2020 (pp. 1-2).
Chinese Application No. 201811209245.X, First Office Action dated Aug. 18, 2020, pp. 1-20.
Chinese Application No. 201811209245.X, Supplementary Search dated Dec. 22, 2020, pp. 1).

* cited by examiner

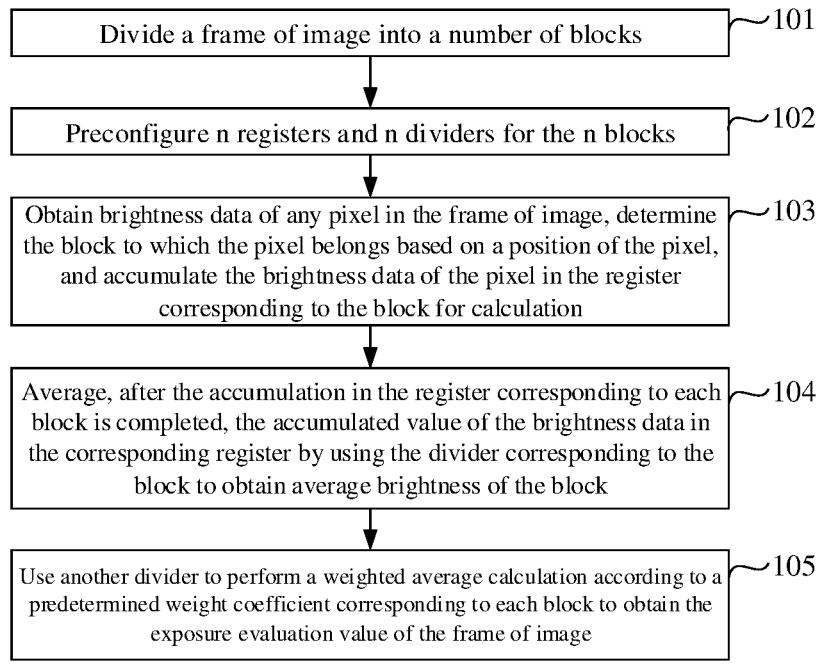
Fig. 1 [ PRIOR ART ]
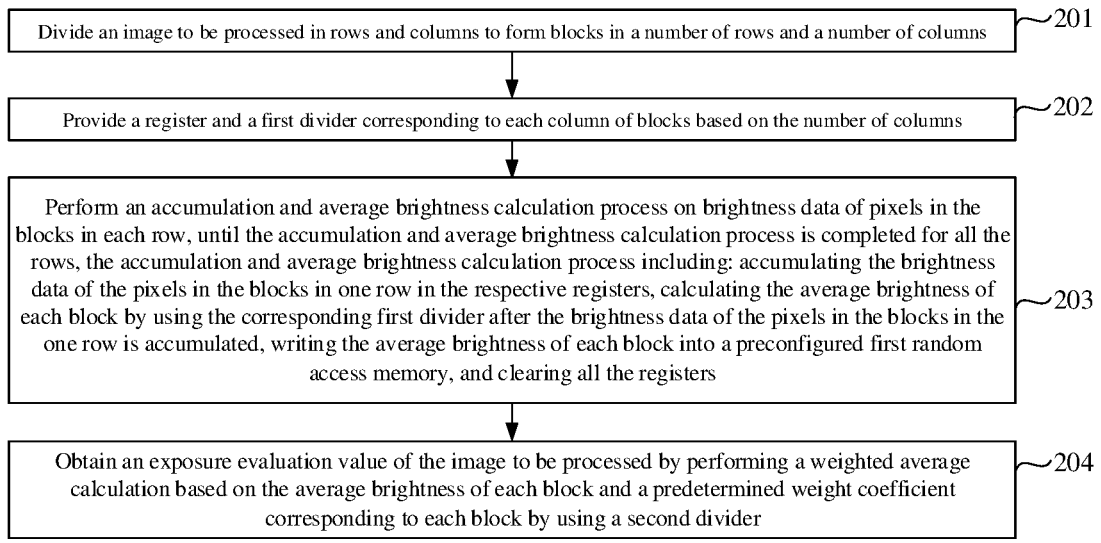
Fig. 2

METHOD FOR CALCULATING EXPOSURE EVALUATION VALUE AND IMAGING DEVICE

CROSS-REFERENCE TO RELATED APPLICATION

The present disclosure is a continuation of PCT Application No. PCT/CN2019/077050, titled "METHOD FOR CALCULATING EXPOSURE EVALUATION VALUE AND IMAGING DEVICE", filed on Mar. 5, 2019, which claims priority to Chinese Patent Application No. 201811209245.X, titled "METHOD FOR CALCULATING EXPOSURE EVALUATION VALUE AND IMAGING DEVICE", filed on Oct. 17, 2018, both of which are incorporated herein by reference in their entirety.

TECHNICAL FIELD

The present disclosure relates to image processing technology, and more particularly, to a method for calculating an exposure evaluation value and an imaging device.

BACKGROUND

Currently, with the improvement of people's living standards and modern industrialization, imaging devices (such as cameras, video cameras, etc.) are increasingly used in various industries in daily lives, such as consumer photography, industrial machine vision, quality detection, autonomous driving, etc. When processing an image from an imaging device, some algorithms can be used to allow a back-end system to automatically perform feature extraction and recognition on the image, such as face recognition, industrial defect detection, security monitoring, and the like. In doing so, the image quality obtained by the imaging device is a very important basis. If the quality of the original image outputted from the imaging device is low (for example, when the image is over-exposed or under-exposed), it will be difficult for the back-end system to perform the image recognition.

In order to obtain an image with proper brightness, typically an Automatic Exposure (AE) algorithm can be used to control an automatic exposure process of the imaging device in an image capturing process. The automatic exposure algorithm process generally needs to first calculate an exposure evaluation value of the image, then determine whether the exposure is proper based on the exposure evaluation value, and finally adjust one or more exposure parameters based on whether the exposure is proper. In the above automatic exposure algorithm process, the calculation of the exposure evaluation value are particularly important. Typically, a method for calculating an exposure evaluation value based on image brightness can be used. This method can be implemented by a Field-Programmable Gate Array (FPGA) and may include: first dividing an image into a number of blocks (each being an area composed of pixels), providing a corresponding register and divider for each block to calculate an average brightness of each block, and finally after all the blocks have been calculated, calculating a weighted average of the average brightness across the blocks to determine an exposure evaluation value of the image.

However, due to increasingly higher requirements on accurate control of automatic exposure nowadays, in an actual automatic exposure process, in order to meet the accuracy of image control, it is generally necessary to divide the image into a large number of blocks, which results in a need for a large number of registers and dividers and in turn a serious waste of FPGA logic resources.

SUMMARY

The embodiments of the present disclosure provides a method of calculating an exposure evaluation value and an imaging device, capable of solving the problem in the related art that a register and a divider are required for each block to accumulate pixel brightness data and calculate an average value, resulting in a serious waste of FPGA logic resources.

In order to achieve the above object, the present disclosure provides the following technical solutions.

In an aspect, a method for calculating an exposure evaluation value is provided according to an embodiment of the present disclosure. The method includes: dividing an image to be processed in rows and columns to form blocks in a number of rows and a number of columns; providing a register and a first divider corresponding to each column of blocks based on the number of columns; performing an accumulation and average brightness calculation process on brightness data of pixels in the blocks in each row, until the accumulation and average brightness calculation process is completed for all the rows, the accumulation and average brightness calculation process including: accumulating the brightness data of the pixels in the blocks in one row in the respective registers, calculating the average brightness of each block by using the corresponding first divider after the brightness data of the pixels in the blocks in the one row is accumulated, writing the average brightness of each block into a preconfigured first random access memory, and clearing all the registers; and obtaining an exposure evaluation value of the image to be processed by performing a weighted average calculation based on the average brightness of each block and a predetermined weight coefficient corresponding to each block by using a second divider.

In some embodiments, the method may further include: obtaining the image to be processed, the image to be processed being a full frame of image for an imaging device, or a partial image extracted from the full frame of image for the imaging device.

In some embodiments, the operation of performing the accumulation and average brightness calculation process on the brightness data of the pixels in the blocks in each row may include: performing the accumulation and average brightness calculation process on the brightness data of the pixels in the blocks in each row sequentially in a predetermined order of the rows.

In some embodiments, the operation of performing the accumulation and average brightness calculation process on the brightness data of the pixels in the blocks in each row may include: selecting one of the number of rows randomly each time and performing the accumulation and average brightness calculation process on the brightness data of the pixels in the blocks in the selected one row.

In some embodiments, the operation of accumulating the brightness data of the pixels in the blocks in one row in the respective registers may include: obtaining the brightness data of the pixels in the blocks in the one row; determining the block to which each pixel belongs based on a position of the pixel in the image to be processed; and accumulating the brightness data of each pixel in the register corresponding to the block to which the pixel belongs.

In some embodiments, the operations of calculating the average brightness of each block by using the corresponding first divider after the brightness data of the pixels in the blocks in the one row is accumulated and writing the average brightness of each block into the preconfigured first random access memory may include: calculating the average brightness corresponding to an accumulated value of the brightness data of each block based on a number of pixels in the block by using the corresponding first divider, after the brightness data of the pixels in the blocks in the one row is accumulated; and writing the average brightness of each block into a corresponding predetermined position in the preconfigured first random access memory. The operation of obtaining the exposure evaluation value of the image to be processed by performing the weighted average calculation based on the average brightness of each block and the predetermined weight coefficient corresponding to each block by using the second divider may include: obtaining the weight coefficient corresponding to each block from a preconfigured second random access memory; and obtaining the exposure evaluation value of the image to be processed by performing the weighted average calculation based on the average brightness of each block and the weight coefficient corresponding to each block by using the second divider.

In another aspect, an imaging device is provided according to an embodiment of the present disclosure. The imaging device includes an image sensor and an image processor. The image sensor is configured to capture an image to obtain an image to be processed. The image processor is configured to: divide the image to be processed in rows and columns to form blocks in a number of rows and a number of columns; provide a register and a first divider corresponding to each column of blocks based on the number of columns; perform an accumulation and average brightness calculation process on brightness data of pixels in the blocks in each row, until the accumulation and average brightness calculation process is completed for all the rows, the accumulation and average brightness calculation process including: accumulating the brightness data of the pixels in the blocks in one row in the respective registers, calculating the average brightness of each block by using the corresponding first divider after the brightness data of the pixels in the blocks in the one row is accumulated, writing the average brightness of each block into a preconfigured first random access memory, and clearing all the registers; and obtain an exposure evaluation value of the image to be processed by performing a weighted average calculation based on the average brightness of each block and a predetermined weight coefficient corresponding to each block by using a second divider.

In some embodiments, the image processor may be further configured to: obtain the image to be processed, the image to be processed being a full frame of image for the imaging device, or a partial image extracted from the full frame of image for the imaging device.

In some embodiments, the image processor may be configured to: perform the accumulation and average brightness calculation process on the brightness data of the pixels in the blocks in each row sequentially in a predetermined order of the rows.

In some embodiments, the image processor may be configured to: select one of the number of rows randomly each time and perform the accumulation and average brightness calculation process on the brightness data of the pixels in the blocks in the selected one row.

In some embodiments, the image processor may be configured to: obtain the brightness data of the pixels in the blocks in the one row; determine the block to which each pixel belongs based on a position of the pixel in the image to be processed; and accumulate the brightness data of each pixel in the register corresponding to the block to which the pixel belongs.

In some embodiments, the image processor may be configured to: calculate the average brightness corresponding to an accumulated value of the brightness data of each block based on a number of pixels in the block by using the corresponding first divider, after the brightness data of the pixels in the blocks in the one row is accumulated; and write the average brightness of each block into a corresponding predetermined position in the preconfigured first random access memory. The image processor may be further configured to: obtain the weight coefficient corresponding to each block from a preconfigured second random access memory; and obtain the exposure evaluation value of the image to be processed by performing the weighted average calculation based on the average brightness of each block and the weight coefficient corresponding to each block.

In yet another aspect, a computer readable storage medium is provided according to an embodiment of the present disclosure. The computer readable storage medium has a computer program stored thereon. The program, when executed by a processor, implements the above method for calculating an exposure evaluation value.

With the method for calculating an exposure evaluation value and the imaging device according to the embodiments of the present disclosure, an image to be processed is first divided in rows and columns to form blocks in a number of rows and a number of columns. Next, a register and a first divider corresponding to each column of blocks are provided based on the number of columns. Then, an accumulation and average brightness calculation process is performed on brightness data of pixels in the blocks in each row sequentially, i.e., accumulating the brightness data of the pixels in the blocks in one row in the respective registers, calculating the average brightness of each block by using the corresponding first divider after the brightness data of the pixels in the blocks in the one row is accumulated, writing the average brightness of each block into a preconfigured first random access memory, and clearing all the registers, until the accumulation and average brightness calculation process is completed for all the rows. Then, an exposure evaluation value of the image to be processed is obtained by performing a weighted average calculation based on the average brightness of each block and a predetermined weight coefficient corresponding to each block by using a second divider. It can be seen that, according to the present disclosure, only one corresponding register and one corresponding first divider are provided for each column of blocks, and the accumulation and average brightness calculation process for the brightness data of the pixels in the blocks in each row and the writing of the average brightness are performed on a per row basis. After each row is processed, the registers can be cleared and the method can continue with a next row. Therefore, the present disclosure does not need to provide a corresponding register for each block for accumulation of the brightness data of the pixels, or provide a corresponding divider for each block for calculation of the average brightness, such that the numbers of registers and dividers required can be reduced, thereby avoiding the problem associated with the serious waste of FPGA logic resources.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures:

FIG. 1 is a flowchart illustrating a method for calculating an exposure evaluation value based on image brightness in the related art;

FIG. 2 is a flowchart illustrating a method for calculating an exposure evaluation value according to an embodiment of the present disclosure;

DETAILED DESCRIPTION OF THE EMBODIMENTS

Figure 3:
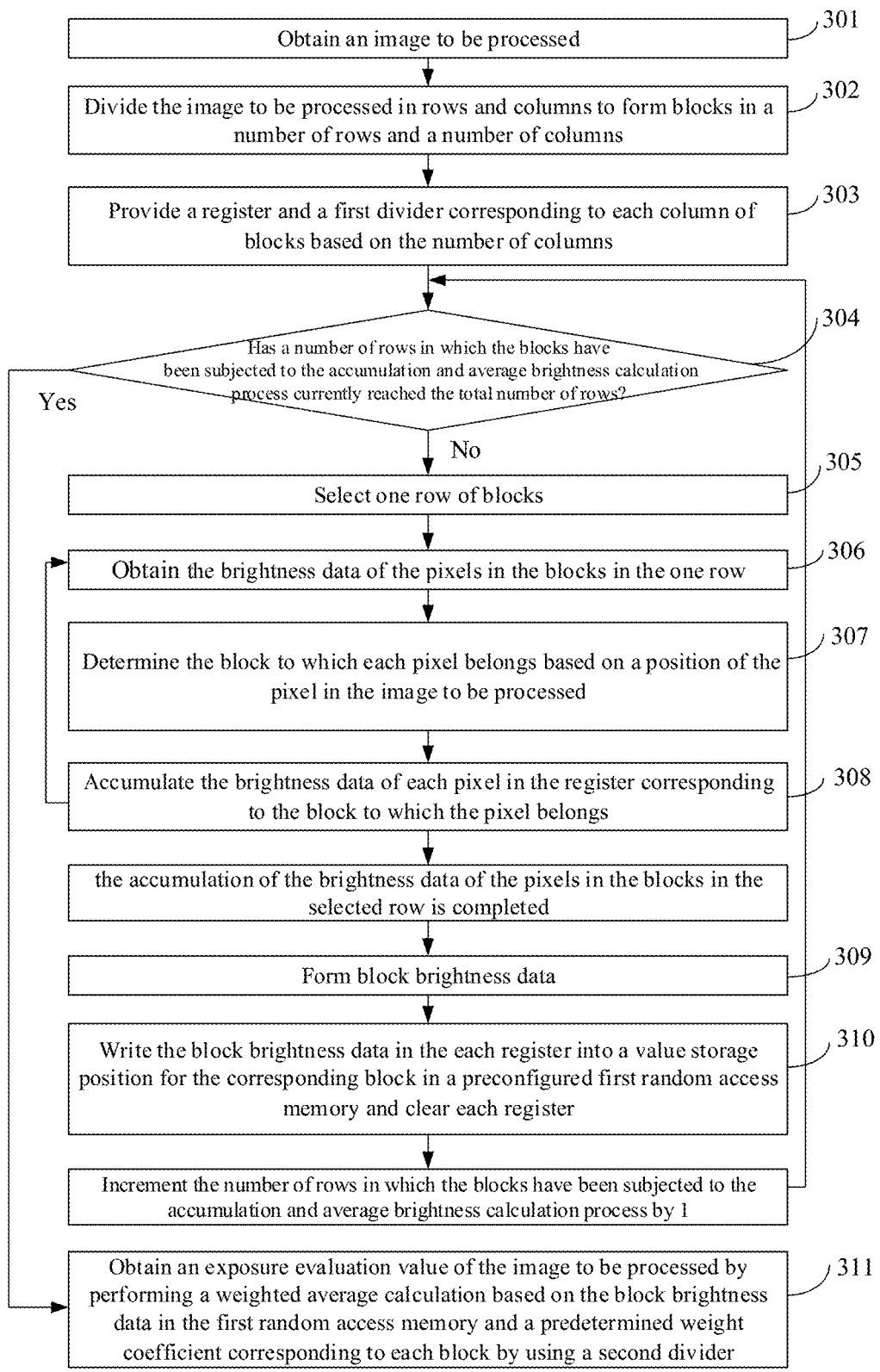
FIG. 3 is another flowchart illustrating a method for calculating an exposure evaluation value according to an embodiment of the present disclosure.

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In order to facilitate understanding of the present disclosure, the technical terms used in the present disclosure will be explained below:

AE: Automatic Exposure. The purpose of AE is to achieve a target brightness level in different light conditions and scenes, such that the captured video or image would not be too dark or too bright. To achieve this, a lens aperture, sensor exposure time, a sensor analog gain, and a digital gain of a sensor or Image Signal Processing (ISP) can be adjusted. This process is known as AE.

FPGA: Field-Programmable Gate Array, a semi-customized circuit in the field of Application Specific Integrated Circuit (ASIC).

RAM: Random Access Memory, also known as "Random Memory", an internal memory that directly exchanges data with a Central Processing Unit (CPU), also referred to as main memory (internal memory).

LUT: Look-Up Table, a storage resource in an FPGA for implement combinational logics and timing logics.

In the process of implementing the embodiments of the present disclosure, the inventor found that a method for calculating an exposure evaluation value based on image brightness in the related art, when implemented using an FPGA, typically includes the following process. As shown in FIG. 1, taking a camera as an imaging device for example, the process of calculating an exposure evaluation value for a frame of image in the camera will be described as follows.

At step 101, the frame of image is divided into a number of blocks. For example, as shown in Table 1 below, one frame of image can be divided into n blocks.

TABLE 1

| 1 | 2 | 3 | ... | i − 1 | 1 |
|---|---|---|-----|-------|---|
| i + 1 | i + 2 | ... | ... | ... | ... |
| ... | ... | ... | ... | ... | ... |
| ... | ... | ... | ... | n − 1 | n |

At step 102, n registers and n dividers are preconfigured for the n blocks.

At step 103, brightness data of any pixel in the frame of image is obtained, the block to which the pixel belongs is determined based on a position of the pixel, and the brightness data of the pixel is accumulated in the register corresponding to the block for calculation.

For example, if the current pixel position belongs to the i-th block, it will be accumulated in the i-th register.

At step 104, after the accumulation in the register corresponding to each block is completed, the accumulated value of the brightness data in the corresponding register is averaged by using the divider corresponding to the block to obtain average brightness of the block.

At step 105, according to a predetermined weight coefficient corresponding to each block, another divider is used to perform a weighted average calculation to obtain the exposure evaluation value of the frame of image.

It can be seen that the above method for calculating the exposure evaluation value based on image brightness in the related art needs to provide and allocate registers and dividers according to the number of the blocks. If the frame of image has many blocks (for example, 256, 512, or even more), correspondingly more registers and dividers needs to be provided. In particular, one divider occupies multiple LUTs, resulting a serious waste of FPGA logic resources in the FPGA-based method for calculating the exposure evaluation value in the related art.

In order to overcome the above problem, as shown in FIG. 2, an embodiment of the present disclosure provides a method of calculating an exposure evaluation value, including the following steps.

At step 201, an image to be processed is divided in rows and columns to form blocks in a number of rows and a number of columns.

At step 202, a register and a first divider corresponding to each column of blocks are provided based on the number of columns.

At step 203, an accumulation and average brightness calculation process is performed on brightness data of pixels in the blocks in each row, until the accumulation and average brightness calculation process is completed for all the rows. Here, the accumulation and average brightness calculation process includes: accumulating the brightness data of the pixels in the blocks in one row in the respective registers, calculating the average brightness of each block by using the corresponding first divider after the brightness data of the pixels in the blocks in the one row is accumulated, writing the average brightness of each block into a preconfigured first random access memory, and clearing all the registers At step 204, an exposure evaluation value of the image to be processed is obtained by performing a weighted average calculation based on the average brightness of each block and a predetermined weight coefficient corresponding to each block by using a second divider.

It can be seen that, with the method for calculating the exposure evaluation value according to the embodiment of the present disclosure, only one corresponding register and one corresponding first divider are provided for each column of blocks, and the accumulation and average brightness calculation process for the brightness data of the pixels in the blocks in each row and the writing of the average brightness are performed on a per row basis. After each row is processed, the registers can be cleared and the method can continue with a next row. Therefore, the present disclosure does not need to provide a corresponding register for each block for accumulation of the brightness data of the pixels, or provide a corresponding divider for each block for calculation of the average brightness, such that the numbers of registers and dividers required can be reduced, thereby avoiding the problem associated with the serious waste of FPGA logic resources.

In order to enable those skilled in the art to better understand the present disclosure, a more detailed embodiment is given below. As shown in FIG. 3, an embodiment of the present disclosure provides a method of calculating an exposure evaluation value, including the following steps.

At step 301, an image to be processed is obtained.

Here, the image to be processed may be a full frame of image for an imaging device, or a partial image extracted from the full frame of image for the imaging device. The imaging device can be a camera, a video camera, or a mobile phone or a tablet computer with photograph and video functions. The present disclosure can not only process a full frame of image, but also process a partial image extracted from the full frame of image (that is, a local image obtained after a certain image edge is removed), and thus has good applicability.

For each image to be processed, the recorded number of rows in which the blocks have been subjected to the accumulation and average brightness calculation process needs to be initialized to 0 before proceeding with step 302, such that the number can be reset.

At step 302, the image to be processed is divided in rows and columns to form blocks in a number of rows and a number of columns.

For example, as shown in Table 2 below, the image to be processed can be divided into v rows (v blocks in the vertical direction) and h columns (h blocks in the horizontal direction) to form blocks in v rows and h columns. A block can be composed of multiple pixels.

TABLE 2

| 1 | 2 | 3 | ... | h − 1 | h |
|---|---|---|-----|-------|---|
| h + 1 | h + 2 | ... | ... | ... | ... |
| ... | ... | ... | ... | ... | ... |
| ... | ... | ... | ... | v* (h − 1) | v*h |

At step 303, a register and a first divider corresponding to each column of blocks are provided based on the number of columns.

Here, a register and a first divider corresponding to each column of blocks can be provided based on the number of columns. For example, there are h columns of blocks in Table 2 above, then h registers and h first dividers can be provided. Each column of blocks corresponds to one register and one first divider.

At step 304, it is determined whether a number of rows in which the blocks have been subjected to the accumulation and average brightness calculation process currently has reached the total number of rows.

If the number of rows in which the blocks have been subjected to the accumulation and average brightness calculation process currently has reached the total number of rows (for example, as shown in Table 2, if the number of rows in which the blocks have been subjected to the accumulation and average brightness calculation process currently has reached v, it means that the accumulation and average brightness calculation process is completed for all the rows), the method proceeds with step 311; or otherwise if the number of rows in which the blocks have been subjected to the accumulation and average brightness calculation process currently has not reached the total number of rows, the method proceeds with step 305.

At step 305, one row of blocks is selected.

Here, the one row of blocks can be selected according to a predetermined order of the rows, or can be selected randomly from the number of rows. For example, as shown in Table 2 above, there are blocks from Row 1 to Row v, and Row 1 can be selected first, then Row 2, and so on, until Row v is selected subsequently. Alternatively, one row can be selected randomly from Row 1 to Row v, until all the rows are selected subsequently. In an embodiment of the present disclosure, the FPGA technology may be used to calculate the exposure evaluation value. Here, the one row of blocks is preferably selected in the order of the rows to facilitate processing by the FPGA.

At step 306, the brightness data of the pixels in the blocks in the one row is obtained.

Here, the brightness data of each pixel may be a grayscale value of the pixel.

At step 307, the block to which each pixel belongs is determined based on a position of the pixel in the image to be processed.

In the above operation of dividing the image to be processed, the image to be processed is divided into the number of rows and the number of columns in rows and columns. Therefore, each block can correspond to an area of pixels in the image to be processed. Once the brightness data of a pixel is obtained, the block to which the pixel belongs can be directly determined based on the position of the pixel in the image to be processed.

At step 308, the brightness data of each pixel is accumulated in the register corresponding to the block to which the pixel belongs.

For example, when there are m pixels in one block, after the brightness data of all the pixels in the block have been accumulated, an accumulated value $L_{acc}$ of the brightness data of the block can be obtained as $$L_{acc} = \sum_{i=1}^{m} L_i = L_1 + L_2 + ... + L_m,$$

where $L_i$ is the brightness data of the i-th pixel.

After step 308, the method returns to step 306, until the accumulation of the brightness data of the pixels in the blocks in the selected row is completed, and then the method proceeds with step 309.

At step 309, block brightness data is formed.

Here, the block brightness data may be the accumulated value of the brightness data of all the pixels in the block, or an average brightness of the block. Here, the average brightness corresponding to the accumulated value of the brightness data of each block can be calculated based on the number of pixels in the block, by using the corresponding first divider, as $$L_{avg} = \frac{L_{acc}}{m},$$

where $L_{avg}$ is the average brightness.

At step 310, the block brightness data in the each register is written into a value storage position for the corresponding block in a preconfigured first random access memory, and each register is cleared.

Here, as shown in Table 3, the value storage position (Value in Table 3 denotes the stored values of the block brightness data) for each block (Addr in Table 3 denotes indices of the blocks) is provided in the first random access memory. k1 to kv*h represent the values of the block brightness data, which may be the accumulated value of the brightness data of the block or the average brightness corresponding to the accumulated value of the brightness data of the block.

TABLE 3

| Addr | Value |
| --- | --- |
| 1 | k1 |
| 2 | k2 |
| ... | ... |
| h | kh |
| ... | ... |
| v*(h − 1) | kv*(h − 1) |
| v*h | kv*h |

In addition, the purpose of clearing each register here is to ensure that each register can continue to be used when the accumulation and average brightness calculation process is performed on a next row of blocks, without having to provide a corresponding register for each block.

After step 310, the number of rows in which the blocks have been subjected to the accumulation and average brightness calculation process is incremented by 1, and then the method returns to step 304.

At step 311, an exposure evaluation value of the image to be processed is obtained by performing a weighted average calculation based on the block brightness data in the first random access memory and a predetermined weight coefficient corresponding to each block by using a second divider.

When implementing the step 311, the block brightness data for each block needs to be read from the first random access memory, and the weight coefficient corresponding to each block can be read from a preconfigured second random access memory. Here, the reading of the data can be controlled by controlling read operation enabling signals. For example, after the above step 304, if the number of rows in which the blocks have been subjected to the accumulation and average brightness calculation process currently has reached the total number of rows, then a read operation enabling signal Rd1_en for the first random access memory can be set to 1, and a read operation enabling signal Rd0_en for the second random access memory can be set to 1, such that the block brightness data for each block can be read from the first random access memory, and the weight coefficient corresponding to each block can be read from the second random access memory.

Here, the step 311 can be implemented as follows.

When the block brightness data is the accumulated value of the brightness data of all the pixels in each block, the average brightness corresponding to the accumulated value of the brightness data of the block in the first random access memory needs to be calculated first based on the number of pixels in the block by using the corresponding first divider. The weight coefficient corresponding to each block can be obtained from the preconfigured second random access memory. The exposure evaluation value of the image to be processed can be obtained by performing a weighted average calculation based on the average brightness of each block and the corresponding weight coefficient by using the second divider.

Alternatively, when the block brightness data is the average brightness of each block, the weight coefficient corresponding to each block can be directly obtained from the preconfigured second random access memory. Then, the exposure evaluation value of the image to be processed can be obtained by performing a weighted average calculation based on the average brightness of each block and the corresponding weight coefficient by using the second divider.

Here, as shown in Table 4, a value storage position (Value in Table 4 denotes the stored weight coefficients corresponding to the blocks) for each block (Addr in Table 4 denotes indices of the blocks) is provided in the second random access memory. w1 to wv*h represent the weight coefficients corresponding to the respective blocks. The weight coefficients corresponding to the respective blocks can be preset and modified depending on the requirements of the image to be processed. The setting and modification of the weight coefficients will not be described here.

TABLE 4

| Addr | Value |
| --- | --- |
| 1 | w1 |
| 2 | w2 |
| ... | ... |
| h | wh |
| ... | ... |
| v*(h − 1) | wv*(h − 1) |
| v*h | wv*h |

In addition, the above operation of obtaining the exposure evaluation value of the image to be processed by performing the weighted average calculation based on the average brightness of each block and the corresponding weight coefficient by using the second divider can be implemented as follows.

The exposure evaluation value B of the image to be processed can be obtained according to $$B = \frac{\sum_{i=1}^{v*h} k_i w_i}{\sum_{i=1}^{v*h} w_i},$$

where wi denotes the weight coefficient corresponding to the i-th block, and ki denotes the average brightness corresponding to the i-th block.

It can be seen that, with the method for calculating the exposure evaluation value according to the embodiment of the present disclosure, only one corresponding register and one corresponding first divider are provided for each column of blocks. For example, for the block division scheme corresponding to Table 2, only h registers and h corresponding first dividers are provided. The accumulation and average brightness calculation process for the brightness data of the pixels in the blocks in each row and the writing of the average brightness are performed on a per row basis. After each row is processed, the registers can be cleared and the method can continue with a next row. Therefore, the present disclosure does not need to provide a corresponding register for each block for accumulation of the brightness data of the pixels, or provide a corresponding divider for each block for calculation of the average brightness, such that the numbers of registers and dividers required can be reduced, thereby avoiding the problem associated with the serious waste of FPGA logic resources. For example, if the image to be processed corresponding to Table 2 is processed using the steps 101 to 105 in the related art, v*h (such as v=32, h=32, then v*h is 1024) registers, v*h first dividers and one second divider would be required. However, with the embodiment of the present disclosure, only h (for example, 32) registers, h first dividers, and one second divider are required. Therefore, the embodiment of the present disclosure can greatly reduces the number of registers and dividers required, and save FPGA logic resources.

Figure 4:
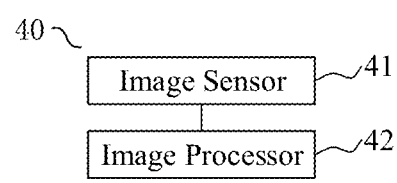
FIG. 4 is a schematic diagram showing a structure of an imaging device according to an embodiment of the present disclosure.

Correspondingly to the above method embodiments shown in FIG. 2 and FIG. 3, an embodiment of the present disclosure provides an imaging device 40 including an image sensor 41 and an image processor 42, as shown in FIG. 4. The image processor 42 may be a programmable logic gate array.

The image sensor 41 is configured to capture an image to obtain an image to be processed.

The image processor 42 is configured to:
  divide the image to be processed in rows and columns to form blocks in a number of rows and a number of columns;
  provide a register and a first divider corresponding to each column of blocks based on the number of columns;
  perform an accumulation and average brightness calculation process on brightness data of pixels in the blocks in each row, until the accumulation and average brightness calculation process is completed for all the rows, the accumulation and average brightness calculation process including: accumulating the brightness data of the pixels in the blocks in one row in the respective registers, calculating the average brightness of each block by using the corresponding first divider after the brightness data of the pixels in the blocks in the one row is accumulated, writing the average brightness of each block into a preconfigured first random access memory, and clearing all the registers; and
  obtain an exposure evaluation value of the image to be processed by performing a weighted average calculation based on the average brightness of each block and a predetermined weight coefficient corresponding to each block by using a second divider.

Further, the image processor 42 may be further configured to: obtain the image to be processed, the image to be processed being a full frame of image for the imaging device, or a partial image extracted from the full frame of image for the imaging device.

In addition, the image processor 42 may be configured to: perform the accumulation and average brightness calculation process on the brightness data of the pixels in the blocks in each row sequentially in a predetermined order of the rows.

In addition, the image processor 42 may be configured to: select one of the number of rows randomly each time and perform the accumulation and average brightness calculation process on the brightness data of the pixels in the blocks in the selected one row.

In addition, the image processor 42 may be configured to: obtain the brightness data of the pixels in the blocks in the one row; determine the block to which each pixel belongs based on a position of the pixel in the image to be processed; and accumulate the brightness data of each pixel in the register corresponding to the block to which the pixel belongs.

In addition, the image processor 42 may be configured to: calculate the average brightness corresponding to an accumulated value of the brightness data of each block based on a number of pixels in the block by using the corresponding first divider, after the brightness data of the pixels in the blocks in the one row is accumulated; and write the average brightness of each block into a corresponding predetermined position in the preconfigured first random access memory.

The image processor 42 may be further configured to: obtain the weight coefficient corresponding to each block from a preconfigured second random access memory; and obtain the exposure evaluation value of the image to be processed by performing the weighted average calculation based on the average brightness of each block and the weight coefficient corresponding to each block.

In addition, a computer readable storage medium is provided according to an embodiment of the present disclosure. The computer readable storage medium has a computer program stored thereon. The program, when executed by a processor, implements the above method for calculating an exposure evaluation value.

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method, comprising:
dividing an image; into a plurality of blocks, the plurality of blocks being arranged in a plurality of rows and a plurality of columns, each of the plurality of blocks comprising a plurality of pixels,
for each row of the plurality of rows:
for each block of the row:
accumulating, by one of a plurality of registers, brightness values of the plurality of pixels in the block to obtain an accumulated brightness value;
calculating, by one of a plurality of first dividers, an average brightness value of the block according to the accumulated brightness value; and
writing the average brightness value of the block into a first random access memory, and
clearing the plurality of registers in response to writing the average brightness value of each block of the row into the first random access memory,
and
obtaining, by a second divider, an exposure evaluation value according to the average brightness values of the plurality of blocks and predetermined weight coefficients of the plurality of blocks.

2. The method claim 1,
wherein, the image is a full frame of image for an imaging device, or a partial image extracted from the full frame of image for the imaging device.

3. The method of claim 1, wherein, the number of plurality of registers is equal to the number of plurality of columns.

4. The method of claim 1, wherein, the number of plurality of first dividers is equal to the number of the plurality of columns said performing the accumulation.

5. The method of claim 1, further comprising:
for each pixel of each row of the plurality of rows:
obtaining the brightness value of the pixel;
determining a block from the row to which the pixel belongs based on a position of the pixel in the image.

6. The method of claim 1, wherein,
calculating the average brightness value of the block according to the accumulated brightness value comprise:
calculating the average block brightness average value according to the accumulated brightness value and the number of the plurality of pixels in the block.

7. The method of claim 1, wherein,
writing the average brightness value of the block into the first random access memory comprises:
writing the average brightness value of the block into a corresponding predetermined position in the first random access memory.

8. The method of claim 1, wherein,
obtaining the exposure evaluation value according to the average brightness values of the plurality of blocks and the predetermined weight coefficients of the plurality of blocks comprises:
obtaining the predetermined weight coefficients from a second random access memory; and
obtaining the exposure evaluation value by performing a weighted average calculation according to the average brightness values of the plurality of blocks and the predetermined weight coefficients of the plurality of blocks.

9. An imaging device, comprising
an image sensor configured to capture an image, and
divide an image into a plurality of blocks, the plurality of blocks being arranged in a plurality of rows and a plurality of columns, each of the plurality of blocks comprising a plurality of pixels,
for each row of the plurality of rows:
for each block of the row:
accumulate, by one of the plurality of registers of the processor,
brightness values of the plurality of pixels in the block to obtain an
accumulated brightness value;
calculate, by one of a plurality of first dividers of the processor, an average brightness value of the block according to the accumulated brightness value; and
write the average brightness value of the block into a first random access memory, and clear the plurality of registers in response to writing the average brightness value of each block of the row into the first random access memory, and obtain, by a second divider of the processor, an exposure evaluation value according to the average brightness values of the plurality of blocks and predetermined weight coefficients of the plurality of blocks.

10. The imaging device of claim 9, wherein,
the image is a full frame of image for the imaging device, or a partial image extracted from the full frame of image for the imaging device.

11. The imaging device of claim 9, wherein, the number of the plurality of registers is equal to the number of the plurality of columns.

12. The imaging device of claim 9, wherein, the number of the plurality of first dividers is equal to the number of the plurality of columns.

13. The imaging device of claim 9, wherein the image processor is further configured to:
for each pixel of each row of plurality of rows:
obtain the brightness value of the pixel;
determine a block from the row to which the pixel belongs based on a position of the pixel in the image.

14. The imaging device of claim 9, wherein
the image processor is configured to:
calculate the
average brightness value of the block according to the accumulated brightness value and the number of the plurality of pixels in the block.

15. The imaging device of claim 9, wherein,
the image processor is configured to:
write the average brightness value of the block into a corresponding predetermined position in the first random access memory.

16. The imaging device of claim 9, wherein,
the image processor is configured to:
obtain the predetermined weight coefficients from a second random access memory; and
obtain the exposure evaluation value by performing a weighted average calculation according to the average brightness values of the plurality of blocks and the predetermined weight coefficients of the plurality of blocks.

17. A non-transitory computer readable storage medium having a computer program stored thereon, the program, when executed by a processor, causes the processor to perform the method of claim 1.

18. A method, comprising:
dividing an image into a plurality of blocks, the plurality of blocks being arranged in a plurality of rows and a plurality of columns, each of the plurality of blocks comprising a plurality of pixels,
for one of the plurality of rows:
accumulating, by a plurality of registers, brightness values of the plurality of pixels in each block of the row of blocks to obtain a plurality of accumulated brightness values;
calculating, by a plurality of first dividers, an average brightness value for each block of the row of blocks according to the accumulated brightness values;
writing the average brightness values into a first random access memory; and
clearing the plurality of registers in response to writing the average brightness values into the first random access memory, and
for a further one of the plurality of rows:
in response to clearing the plurality of registers, accumulating, by the plurality of registers, brightness values of the plurality of pixels in each block of the further row of blocks to obtain a further plurality of accumulated brightness values.

19. The method of claim 18, further comprising:
calculating, by the plurality of first dividers, a further average brightness value for each block of the further row of blocks according to the further plurality of accumulated brightness values,
writing the further average brightness values into the first random access memory, and
clearing the plurality of registers in response to writing the further average brightness values into the first random access memory.

20. The method of claim 18, wherein the number of the plurality of columns is equal to the number of the plurality of registers.

* * * * *